(12) United States Patent
Kim

(10) Patent No.: US 7,310,937 B2
(45) Date of Patent: Dec. 25, 2007

(54) CLEAN ROOM CHAIN

(76) Inventor: Kyung-Min Kim, #101-1804, Anrak-SK Apt., 427-57, Anrak 2-Dong, Dongrae-Gu, Busan, 607-772 (KR)

( * ) Notice: Subject to any disclaimer, the term of this patent is extended or adjusted under 35 U.S.C. 154(b) by 0 days.

(21) Appl. No.: 11/549,044

(22) Filed: Oct. 12, 2006

(65) Prior Publication Data

US 2007/0130909 A1    Jun. 14, 2007

(30) Foreign Application Priority Data

Oct. 18, 2005    (KR) ...................... 10-2005-0098152

(51) Int. Cl.
*F16G 13/00* (2006.01)
(52) U.S. Cl. ............................ 59/78.1; 59/900; 248/49
(58) Field of Classification Search ................. 59/78.1; 248/49, 51
See application file for complete search history.

(56) References Cited

U.S. PATENT DOCUMENTS 6,725,642 B2 *    4/2004    Tsutsumi et al. ............ 59/78.1
6,745,555 B2 *    6/2004    Hermey et al. .............. 59/78.1
7,204,075 B2 *    4/2007    Utaki ......................... 59/78.1
2006/0112671 A1 *   6/2006    Blase et al. ................. 59/78.1

FOREIGN PATENT DOCUMENTS

JP    2003-299233    10/2003

\* cited by examiner

*Primary Examiner*—David B Jones
(74) *Attorney, Agent, or Firm*—IPLA P.A.; James E. Bame

(57) ABSTRACT

A clean room chain comprises link bodies each having an elastic link which includes a polygonal connector and an elastic piece connected to the polygonal connector, a polygonal recess formed in a center of the link body opens to a lead-in path, the polygonal connector protrudes on a side of the recess opposite the lead-in path, the polygonal connector of one of the link bodies is fittingly inserted through the lead-in pass into the polygonal recess of another corresponding one of the link bodies. First and second connector units connect a parallel adjacent pair of the link bodies where the first connector unit connects each upper end of the pair of the link bodies and the second connector unit connects each lower end of the pair of the link bodies.

4 Claims, 6 Drawing Sheets

CLEAN ROOM CHAIN

CROSS REFERENCE

Applicant claims foreign priority under Paris Convention and 35 U.S.C. § 119 to a Korean Patent Application No. 10-2005-0098152, filed Oct. 18, 2005 with the Korean Intellectual Property Office.

TECHNICAL FIELD

The present invention relates to a clean room chain used for wiring lines in information technology (IT) industry and various mechanical apparatuses and robots for industry that require small amounts of dust and noise, and more particularly, to a clean room chain in which an elastic link is integrated with a link that forms a clean room chain to closely connect links to each other so that the amounts of dust and noise of the clean room chain are reduced and that the productivity and durability of the clean room chain are maximized.

BACKGROUND ART

In general, a clean room chain is used for wiring lines in information technology (IT) industry and various mechanical apparatuses and robots for industry that require small amounts of dust and noise.

In a conventional art, an additional elastic connector member for connecting a plurality of links to each other is provided in a clean room chain so that the elastic connector member is inserted into the coupling holes formed in the links.

Therefore, the durability of the clean room chain deteriorates and large amounts of dust and noise are generated.

DISCLOSURE OF THE INVENTION

Accordingly, the present invention has been made keeping in mind the above problems occurring in the prior art, and an object of the present invention is to provide a clean room chain used for wiring lines in LCD production lines, information technology (IT) industry and various mechanical apparatuses and robots for industry that require small amounts of dust and noise, and more particularly, a clean room chain in which an elastic link is integrated with a link that forms a clean room chain to closely connect links to each other so that the amounts of dust and noise of the clean room chain are reduced and that the productivity and durability of the clean room chain are maximized.

Therefore, according to the present invention, there is provided a clean room chain including oblique surfaces inwardly inclined from both of lower ends, a depressed surface and a protruded surface that are formed on the oblique surfaces, pin coupling holes whose operating spaces are formed on the boundaries of the oblique surfaces on the sides of openings, a guide recess into which a guide protrusion is inserted and the guide protrusion that are formed on the operating spaces, a link comprised of a coupling recess and a coupling protrusion that are formed in the upper end of the link on the right and left sides, a fixing pin for connecting a plurality of links to each other, and connector units for connecting the links to each other. The clean room chain includes a link integrated with an elastic link that includes a polygonal connecting recess formed in the center of a link body, a connecting path whose one side is opened to be connected to the connecting recess, a connector that protrudes from the connecting recess to the other side of the connecting path and whose end is polygonal, and an elastic piece for connecting the connector and the connecting recess to each other, and connector units inserted into engaging holes provided in the upper and lower ends of the link to connect the links to each other. The connectors of the elastic links are inserted into the connecting recesses in the plurality of corresponding links so that the links are connected to each other through the connector units to form a clean room chain. The elastic link is integrated with the connecting recess of the link.

The connecting recess that is a main part of the present invention is square or octagonal. A wrinkle for generating elasticity is formed in the elastic piece of the elastic link.

BEST MODE FOR CARRYING OUT THE INVENTION

Figure 1:
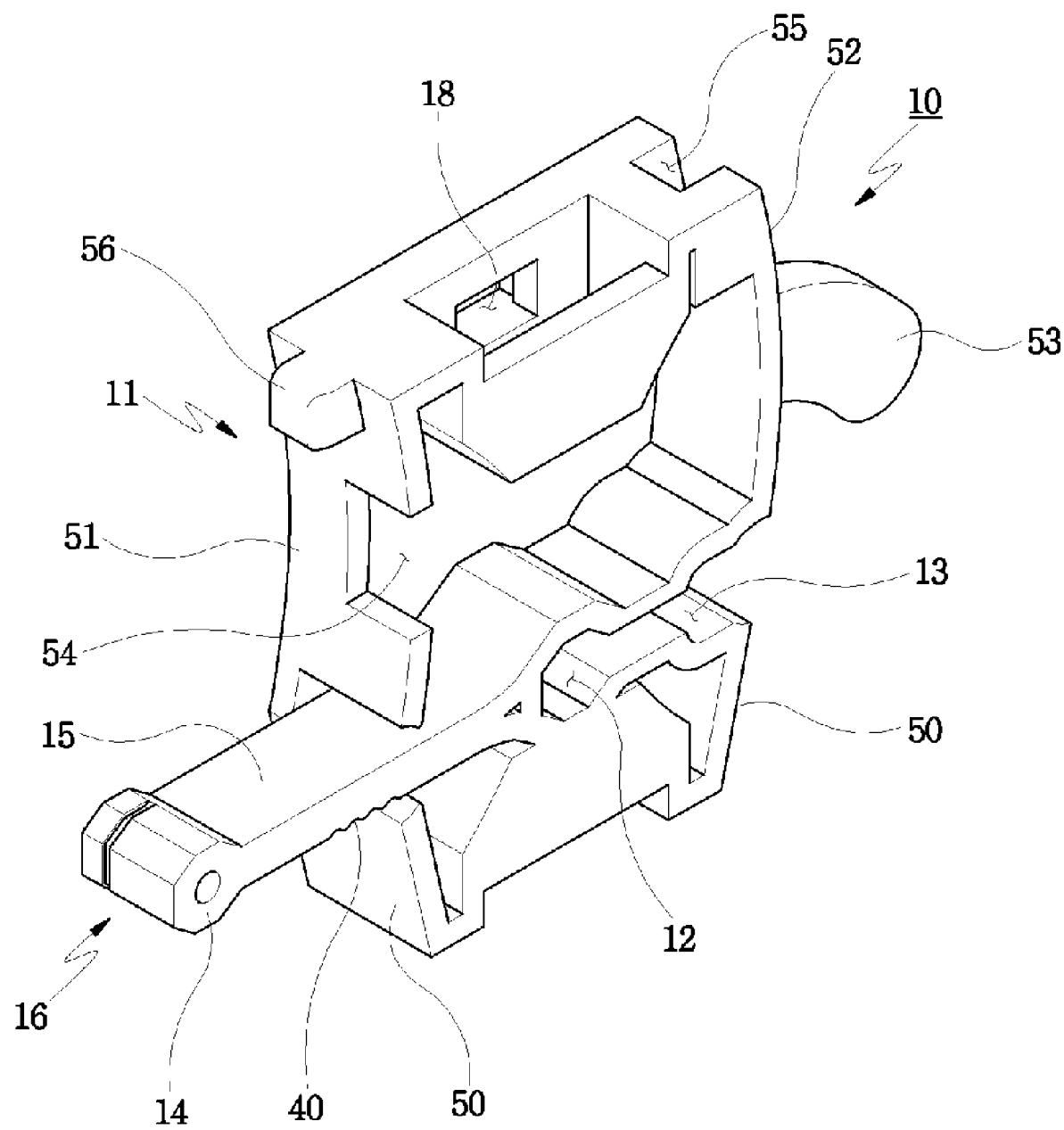
FIG. 1 is a perspective view illustrating a link according to the present invention.
Figure 2:
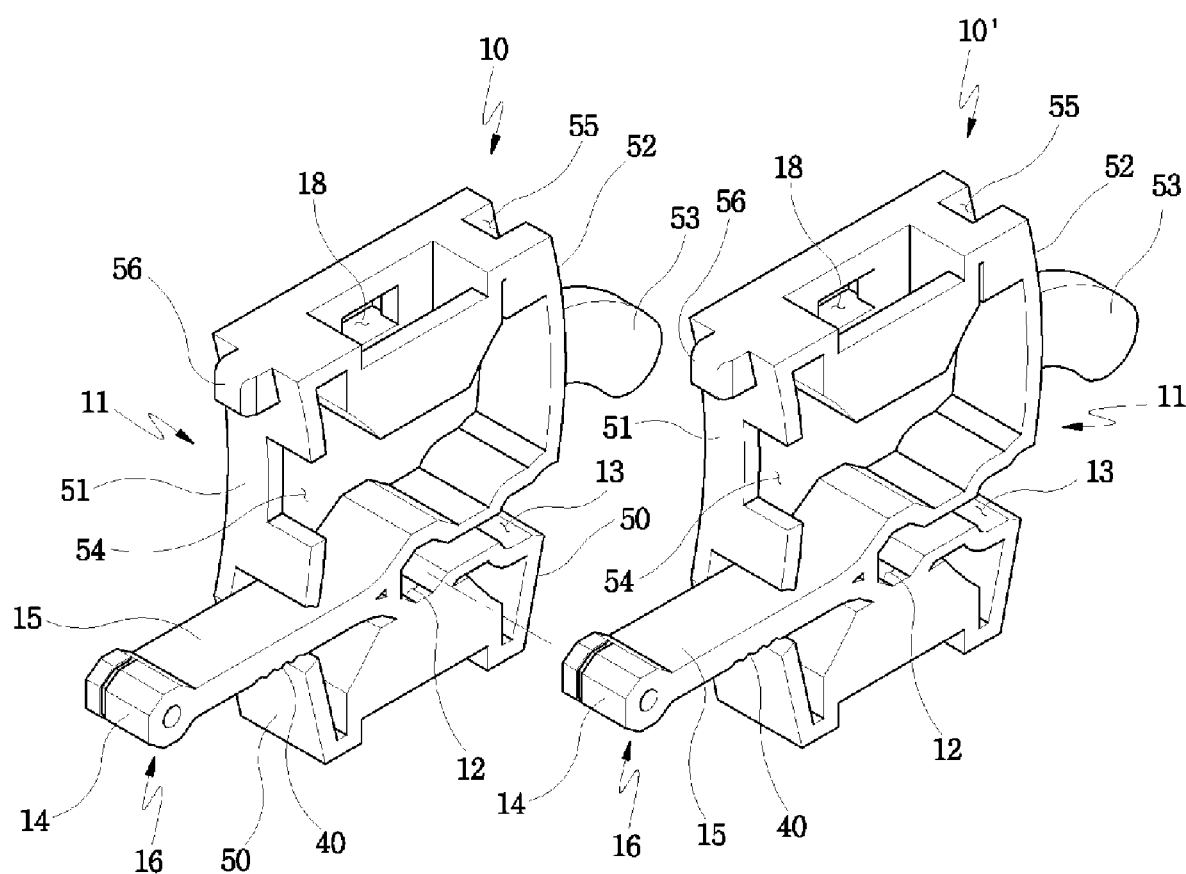
FIG. 2 illustrates that the links according to the present invention are being coupled with each other.
Figure 3:
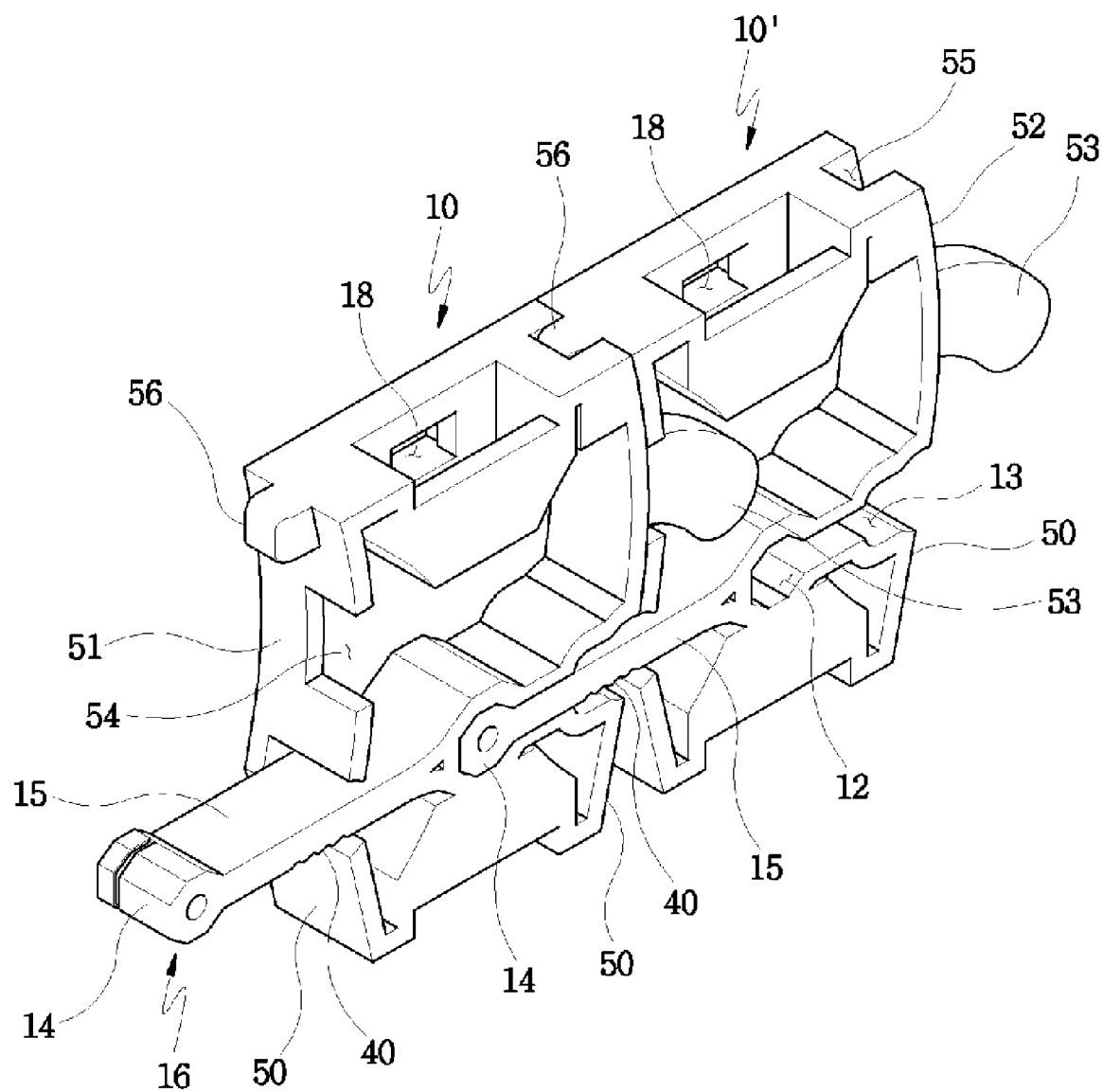
FIG. 3 illustrates that the links according to the present invention have been coupled with each other.

A clean room chain 100 used for a clean room comprises a plurality of link bodies 10 each having an elastic link 16, wherein the elastic link 16 includes a polygonal connector 14 and an elastic piece 15 connected to the polygonal connector 14, wherein a polygonal recess 12 formed in a center of the link body 10 opens to a lead-in path 13, wherein the polygonal connector 14 protrudes on a side of the recess 12 opposite the lead-in path 13, wherein the polygonal connector 12 of one of the link bodies 10 is fittingly inserted through the lead-in pass 13 into the polygonal recess 12 of another of the link bodies 10; and first and second connector units 20 to connect a parallel adjacent pair of the link bodies 10, wherein the first connector unit connects each upper end of the pair of the link bodies 10 and the second connector unit connects each lower end of the pair of the link bodies 10.

In an embodiment, the recess 12 can be square or octagonal. A wrinkle 40 is formed in the elastic piece 15 of the elastic link 16. The clean room chain further comprises U-shaped couplers 30 each inserted through a body hole 18 of the link body into a unit hole 22 of the connector unit 20 to facilitate connection of the connector units to the link bodies 10.

The oblique surfaces 50 inwardly inclined at lower ends of the link bodies 10, a depressed surface 51 and a protruded surface 52 formed on the oblique surfaces 50, operating spaces 12 and 13 formed on the boundaries of the oblique surfaces 50, a guide recess 54 formed such that a guide protrusion 53 of another of the link bodies 10 is inserted therein, and the guide protrusion 53 formed above the operating spaces 12 and 13, a fixing pin provided for connecting a plurality of links 10 and 10' to each other, and first and second connector units 20 serving as the fixing pin provided for connecting the links 10 and 10' to each other, which is similar to a conventional clean room chain.

However, according to the present invention, an elastic link 16 of the link body 10 is used for coupling the links 10 and 10' with each other and an additional coupler 30 is used for stably coupling the links 10 and 10' with each other compared with the case in which the links 10 and 10' are coupled with each other by the connector units 20 so that it is possible to stably couple the links with each other, to prevent the links from being released from each other due to frequent motions, and to reduce the amounts of dust and noise, which will be described in detail with reference to the attached drawings.

That is, as illustrated in FIGS. 1 to 6, there is provided the link 10 integrated with an elastic link 16 that includes a polygonal connecting recess 12 formed in the center of a link body 11, a lean-in path 13 open to the polygonal recess 12, a polygonal connector 14 that protrudes opposite the connecting path 13, and an elastic piece 15 for connecting the connector 14 and the connecting recess 12 to each other.

Connector units 20 are inserted into engaging holes 18 provided in the upper and lower ends of the link 10 to connect in parallel the links 10 and 10' to each other.

Therefore, the polygonal connectors 14 extending from the elastic links 16 are inserted into the connecting recesses 12 in the plurality of corresponding links 10 and 10' so that the links 10 and 10' are connected to each other through the connector units 20 to form a clean room chain 100. The elastic link 16 is formed opposing the connecting recess 12 of the link 10.

First, as illustrated in FIGS. 1 to 6, the clean room chain according to the present invention includes oblique surfaces 50 inwardly inclined from both of lower ends and a depressed surface 51 and a protruded surface 52 that are formed on the oblique surfaces 50, which is the same as the conventional clean room chain.

Operating spaces (the connecting recess 12 and the connecting path 13) are formed on the boundaries of the oblique surfaces 50 on the sides of openings. A guide recess 54 into which a guide protrusion 53 is inserted and the guide protrusion 53 are formed on the operating spaces 12 and 13.

Also, a coupling recess 55 and a coupling protrusion 56 are formed in the right and left upper parts of the link 10, which is the same of the conventional clean room chain.

The plurality of links 10 are coupled with each other by the upper and lower connector units 20 to form the clean room chain 100, which is the same of the conventional clean room chain 1.

However, the clean room chain according to the present invention is different from the conventional clean room chain in that the connecting path 13 and the connecting recess 12 are formed in the body 11 of the link 10 so that the connecting recess 12 is polygonal. That is, unlike a circular pin coupling hole 8 formed in an operating space 8a, the connecting recess 12 is polygonal. Also, unlike in the conventional clean room chain where an additional elastic connector member 9 is inserted into the pin coupling hole 8, the elastic link 16 having the elastic piece 15 is molded to be integrated with the link 10.

Therefore, the connector 14 having the same shape as the polygonal shape of the connecting recess 12 so that the connector 14 can be tightly fitted into the inner circumference of the connecting recess 12 is provided in the end of the elastic link 16 integrated with the link 10.

The connector 14 is firmly inserted into the connecting recess 12 across the connecting path 13 so that the elastic link 16 integrated with the link 10 connects the links 10 to each other.

Figure 4:
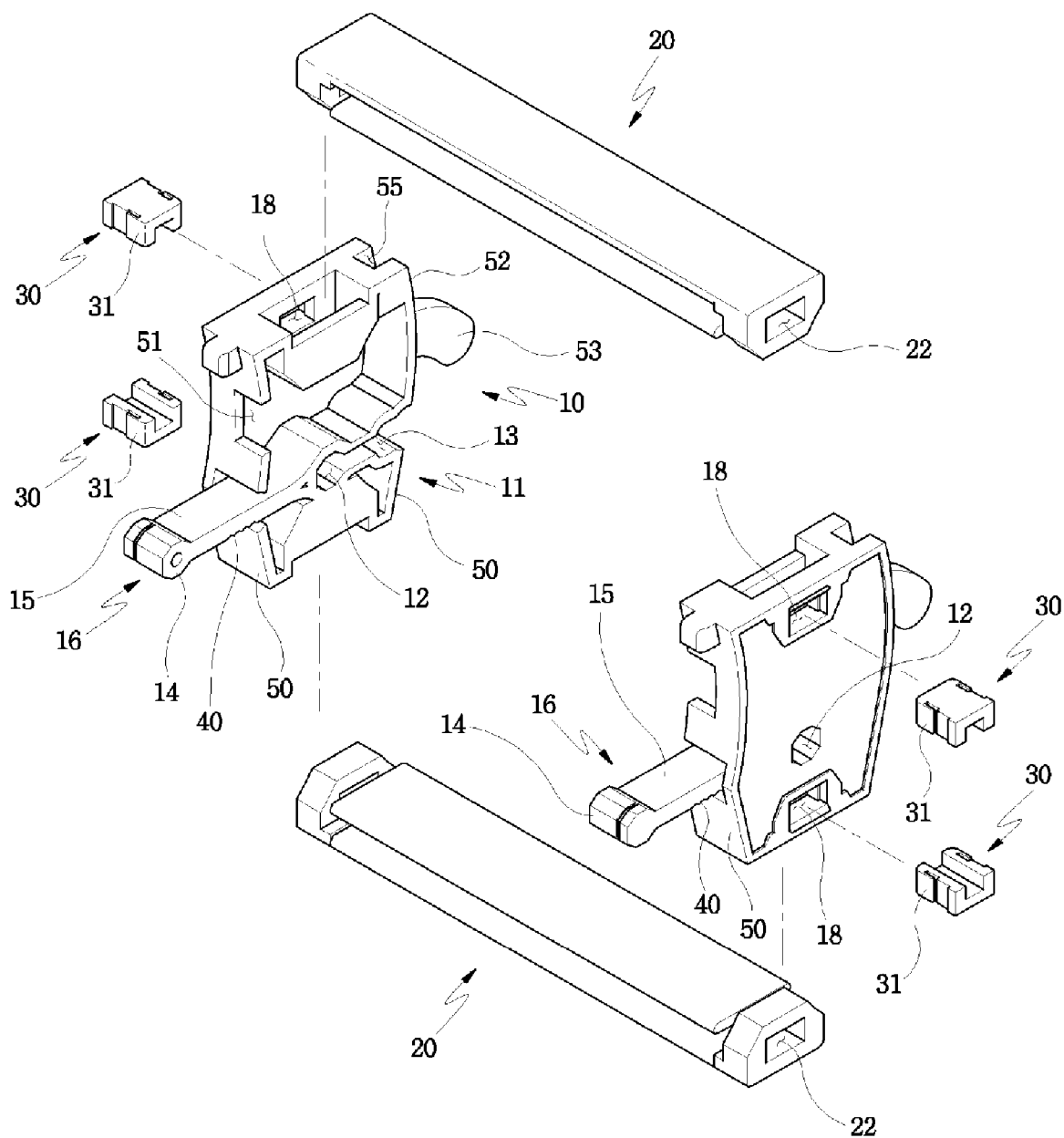
FIG. 4 is an exploded perspective view illustrating that the links according to the present invention are being coupled with connector units.
Figure 5:
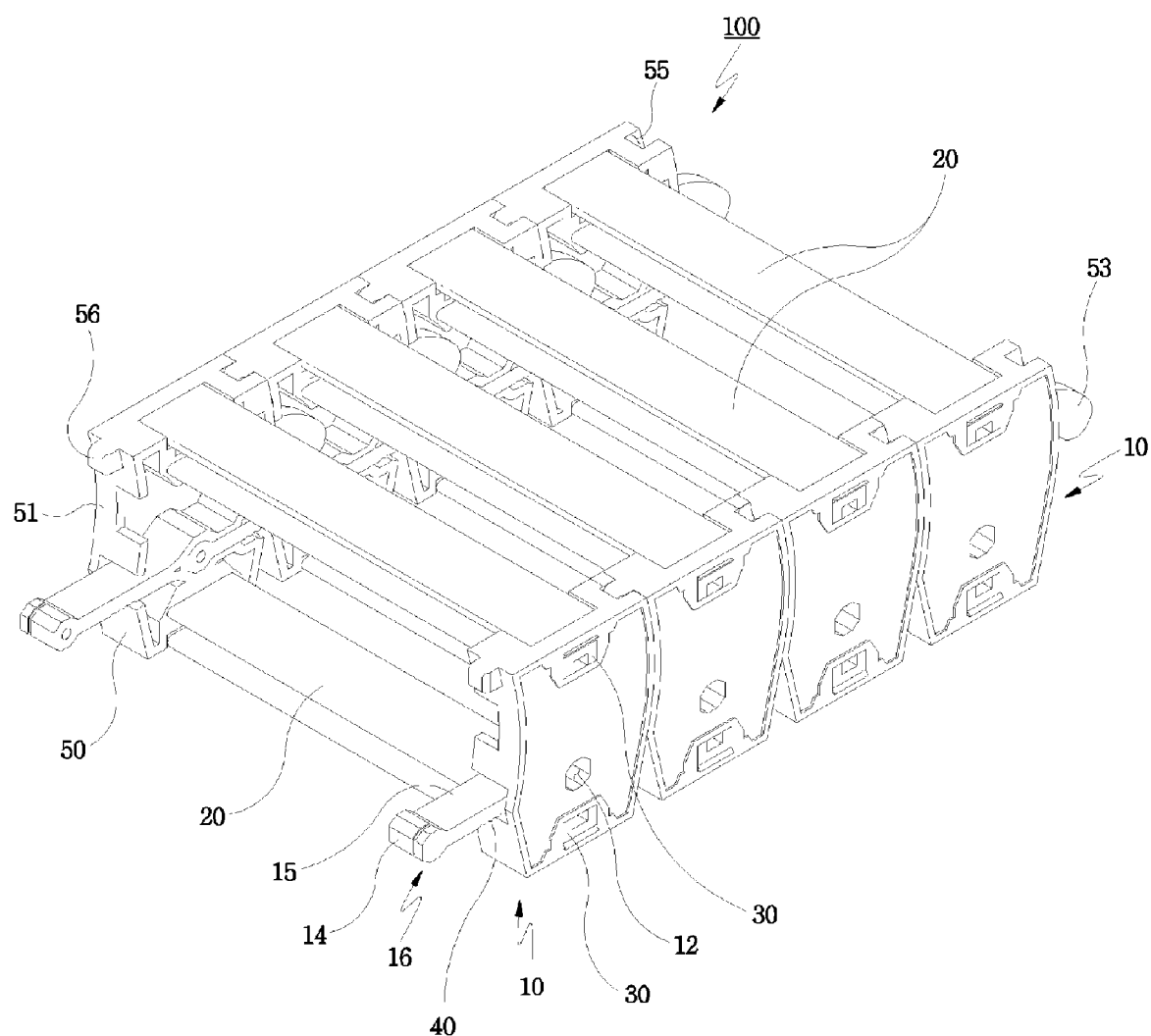
FIG. 5 is a perspective view illustrating that the links according to the present invention have been coupled with each other to form a clean room chain.

When the plurality of links 10 are coupled with each other by the elastic links 16 to form a clean room chain, as illustrated in FIGS. 4 and 5, the links 10 are coupled with each other through the connector units 20. That is, the links 10 are coupled with each other to form an oval and the two lines of ovals are arranged to be coupled with each other from side to side using the connector units 20.

As illustrated in FIG. 4, the links 10 are coupled with each other by inserting the linear connector units 20 in the upper and lower parts of the links 10.

Figure 6:
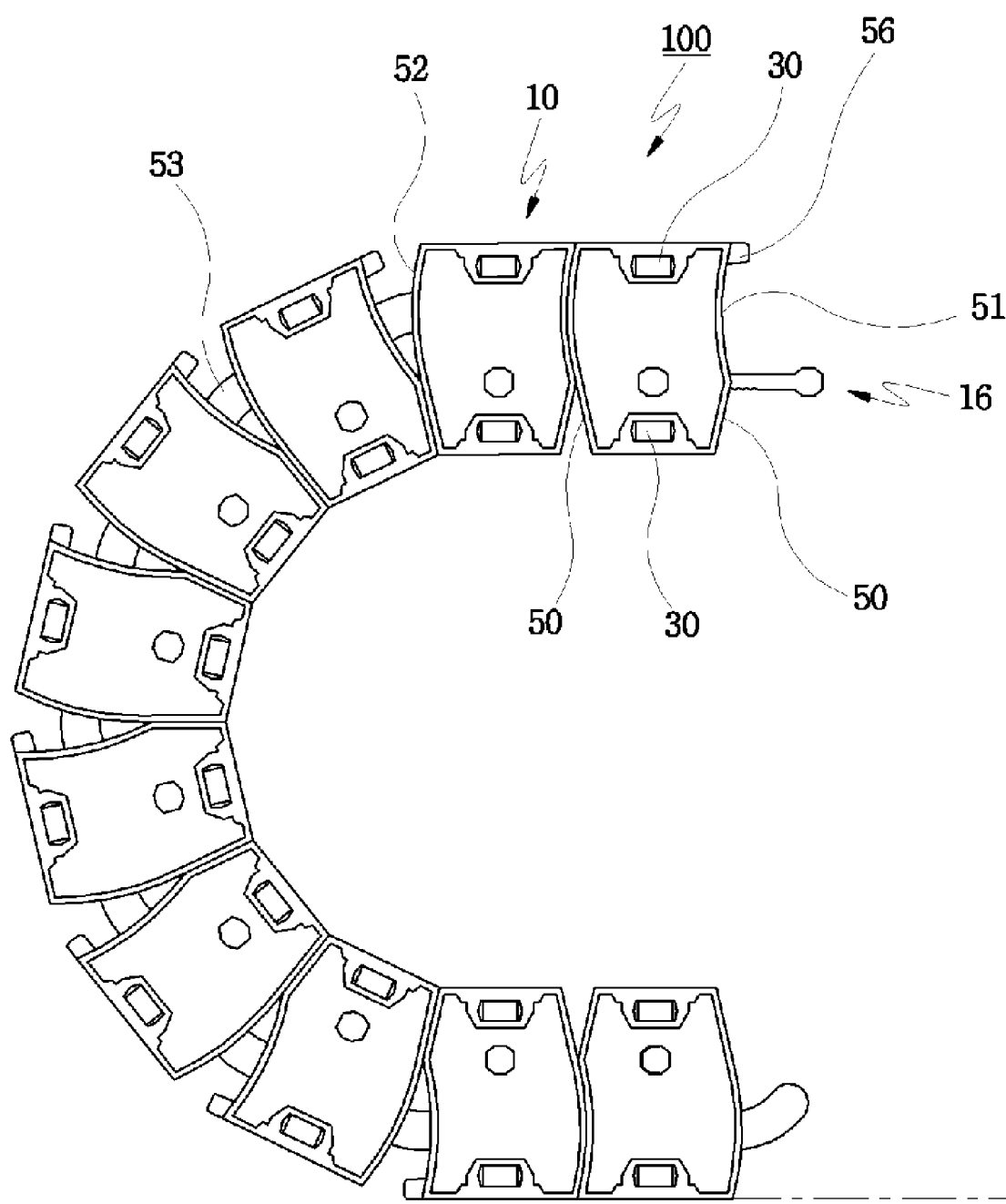
FIG. 6 is a side view illustrating that the links according to the present invention have been coupled with each other to form a clean room chain so that the clean room chain moves.

Therefore, in the linear sections of the links 10 connected to each other, the protruded surfaces 52 are inserted into the depressed surfaces 51. As illustrated in FIG. 6, in the curved section, the oblique surfaces 50 formed to be inwardly inclined from the lower ends of the links 10 contact each other.

Therefore, the clean room chain 100 rotates such that the elastic piece 15 of the elastic link 16 that connects the adjacent links 10 to each other is curved.

As a result, the clean room chain 100 formed of the links 10 coupled with each other rotates in the form of a caterpillar to be moved.

As described above, the connecting recess 12 is square or octagonal and the connector unit 14 that is the end of the elastic link 16 is also square or octagonal so that the connector unit 14 is inserted into the connecting recess 12.

That is, when the link 10 moves to the curved section in a state where the connector 14 that is the end of the elastic link 16 is inserted into the connecting recess 12 so that the rotation is prevented, the elastic piece 15 of the elastic link 16 is naturally curved to be moved.

Since the elastic piece 15 of the elastic link 16 must be always curved while moving up and down, the wrinkle 40 for generating elasticity is preferably formed in the elastic piece 15 of the elastic link 16.

That is, as illustrated in FIG. 1, when the wrinkle 40 is formed in the elastic piece 15, the elastic piece 15 is naturally curved and is easily recovered so that the durability of the clean room chain 100 according to the present invention improves.

Square coupling holes 22 are formed in the right and left ends of the upper and lower connector units 20 connected to each other through the engaging holes 18 formed in the upper ends of the links 10. U-shaped couplers 30 each having elastic locking protrusions 31 on right and left sides are formed to be inserted into the engaging holes 18 of the links 10 and to be penetratingly coupled with the coupling holes 22 of the connector units 20.

Therefore, the couplers 30 are inserted into the engaging holes 18 and are coupled with the coupling holes 22 of the connector units 20 to form the clean room chain 100.

That is, according to the present invention, the couplers 30 are inserted into the engaging holes 18 in a state where the engaging holes 18 are formed in the upper and lower parts of the links 10 so that the couplers 30 are inserted into the coupling holes 22 formed in the right and left ends of the connector units 20.

In order to have the couplers 30 and the coupling holes 22 remain firmly coupled with each other, the couplers 30 are formed to be U-shaped and the elastic locking protrusions 31 are formed on the right and left sides of each of the couplers 30 so that the elastic locking protrusions 31 are tightly inserted into the coupling holes 22 of the connector units 20 and are not separated from the coupling holes 22 of the connector units 20.

Therefore, the durability of the clean room chain 100 according to the present invention is improved.

As described above, according to the present invention, since the elastic link for connecting the links to each other is molded to be integrated with the link, it is possible to firmly and easily couple the links with each other and to reduce the amounts of dust and noise when the clean room chain is operated.

Also, according to the present invention, since the elastic link for connecting the links to each other is molded to be integrated with the link, it is possible to reduce cost of molding, which is economical, and to stably move the elastic link so that the clean room chain is smoothly transferred and that the durability of the clean room chain is improved.

Furthermore, according to the present invention, it is possible to prevent the links from being separated from the connector units and to improve the durability of the clean room chain.

The invention claimed is:

1. A clean room chain used for a clean room, comprising:
    link bodies (10) each having an elastic link (16), wherein the elastic link (16) includes a polygonal connector (14) and an elastic piece (15) connected to the polygonal connector (14), wherein a polygonal recess (12) formed in a center of the link body (10) opens to a lead-in path (13), wherein the polygonal connector (14) protrudes on a side of the recess (12) opposite the lead-in path (13), wherein the polygonal connector (12) of one of the link bodies (10) is fittingly inserted through the lead-in pass (13) into the polygonal recess (12) of another corresponding one of the link bodies (10); and
    first and second connector units (20) to connect a parallel adjacent pair of the link bodies (10), wherein the first connector unit connects each upper end of the pair of the link bodies (10) and the second connector unit connects each lower end of the pair of the link bodies (10).

2. The clean room chain according to claim 1, wherein the recess (12) is square or octagonal.

3. The clean room chain according to claim 1, wherein a wrinkle (40) is formed in the elastic piece (15) of the elastic link (16).

4. The clean room chain according to claim 1, further comprising U-shaped couplers (30) each inserted through a body hole (18) of the link body into a unit hole (22) of the connector unit (20) to facilitate connection of the connector units to the link bodies (10).

* * * * *